(12) United States Patent
Best et al.

(10) Patent No.: US 12,683,811 B2
(45) Date of Patent: Jul. 14, 2026

(54) ENCRYPTED PHYSICALLY UNCLONABLE FUNCTION CIRCUIT HELPER DATA

(71) Applicant: Cryptography Research, Inc., San Jose, CA (US)

(72) Inventors: Scott C. Best, Palo Alto, CA (US); Joel Wittenauer, Pleasanton, CA (US)

(73) Assignee: Cryptography Research, Inc., San Jose, CA (US)

( * ) Notice: Subject to any disclaimer, the term of this patent is extended or adjusted under 35 U.S.C. 154(b) by 395 days.

(21) Appl. No.: 17/766,414

(22) PCT Filed: Sep. 28, 2020

(86) PCT No.: PCT/US2020/053134
§ 371 (c)(1),
(2) Date: Apr. 4, 2022

(87) PCT Pub. No.: WO2021/071691
PCT Pub. Date: Apr. 15, 2021

(65) Prior Publication Data
US 2024/0056316 A1 Feb. 15, 2024

Related U.S. Application Data

(60) Provisional application No. 62/978,631, filed on Feb. 19, 2020, provisional application No. 62/912,351, filed on Oct. 8, 2019.

(51) Int. Cl.
*H04L 9/32* (2006.01)
*H04L 9/08* (2006.01)

(52) U.S. Cl.
CPC .......... *H04L 9/3278* (2013.01); *H04L 9/0866* (2013.01)

(58) Field of Classification Search
CPC ............................ H04L 9/3278; H04L 9/0866
(Continued)

(56) References Cited

U.S. PATENT DOCUMENTS

| | | | |
|---|---|---|---|
| 8,667,265 B1 * | 3/2014 | Hamlet | ................. H04L 9/3278 713/185 |
| 2015/0234751 A1 * | 8/2015 | Van Der Sluis | .... G06F 12/1408 713/193 |

(Continued)

FOREIGN PATENT DOCUMENTS

| | | |
|---|---|---|
| EP | 3046095 A1 | 7/2016 |
| WO | WO-2018-078003 A1 | 5/2018 |

OTHER PUBLICATIONS

Peterson, Leveraging Asymmetric Authentication to Enhance Security-Critical Applications Using Zynq-7000 All Programmable SoCs, Oct. 20, 2015, https://xilinx.eetrend.com/files-eetrend-xilinx/download/201512/9574-21502-wp468asym-auth-zynq-7000.pdf (Year: 2015).*
(Continued)

*Primary Examiner* — Zi Ye
(74) *Attorney, Agent, or Firm* — The Neudeck Law Firm, LLC

(57) ABSTRACT

Multiple helper data solutions (a.k.a., helper data blocks), and therefore multiple possible PUF output values, are generated for a given integrated circuit die. These helper data blocks are encrypted and stored in a nonvolatile memory on the integrated circuit die. Each helper data block is encrypted such that each helper data block can only be decrypted by a decryption key that is different from the other encrypted helper data blocks stored on that integrated circuit die. The keys to decrypt the multiple helper data blocks are released one at a time and spread over time. Because the helper data is encrypted, each PUF output value is only discoverable when its associated key is released. Accord- (Continued)

ingly, counterfeit systems or integrated circuits will need to be re-reverse engineered each time a new key is released.

20 Claims, 12 Drawing Sheets

(58) Field of Classification Search
USPC ........................................................ 380/28
See application file for complete search history.

(56)                    References Cited

U.S. PATENT DOCUMENTS

2019/0158299 A1    5/2019  Poo et al.
2019/0165954 A1    5/2019  Lu

OTHER PUBLICATIONS

Abhranil Maiti et al "A Robust Physical Uncionable Function With Enhanced Challenge-Response Set" IEEE Transactions on Information Forensics and Security, vol. 7, No. 1, Feb. 2012. 13 pages.

Aydin Aysu et al. "End-to-end Design of a PUF based Privacy Preserving Authentication Protocol" CHES 2015. LNCS, vol. 9293, pp. 556-676. Springer, Heidelberg (2016). 31 pages.
Jeroen Delvaux et al "Helper Data Algorithms for PUF-Based Key Generation: Overview and Analysis" Shanghai Jiao Tong University, IEEE Transactions on Computer-Aided Design of Integrated Circuits and Systems, http://ieeexplore.ieee.org/xpl/articleDetails.jsp?arnumber=6966637. DOI: 10.1109/TCAD.2014.2370531. 14 pages.
Notification of Transmittal of the International Search Report and the Written Opinion of the International Searching Authority, or the Declaration with Mail Date Mar. 4, 2021 re: Int'l Appln. No. PCT/US2020/053134. 10 pages.
EP Extended European Search Report with Mail Date Sep. 25, 2023 re: EP Appln. No. 20874898.8. 9 pages.
Kusters, Lieneke et al., "Security of Helper Data Schemes for SRAM-PUF in Multiple Enrollment Scenarios", 2017 IEEE International Symposium on Information Theory (ISIT), doi: 10.1109/ISIT.20178006840. 5 pages.

* cited by examiner

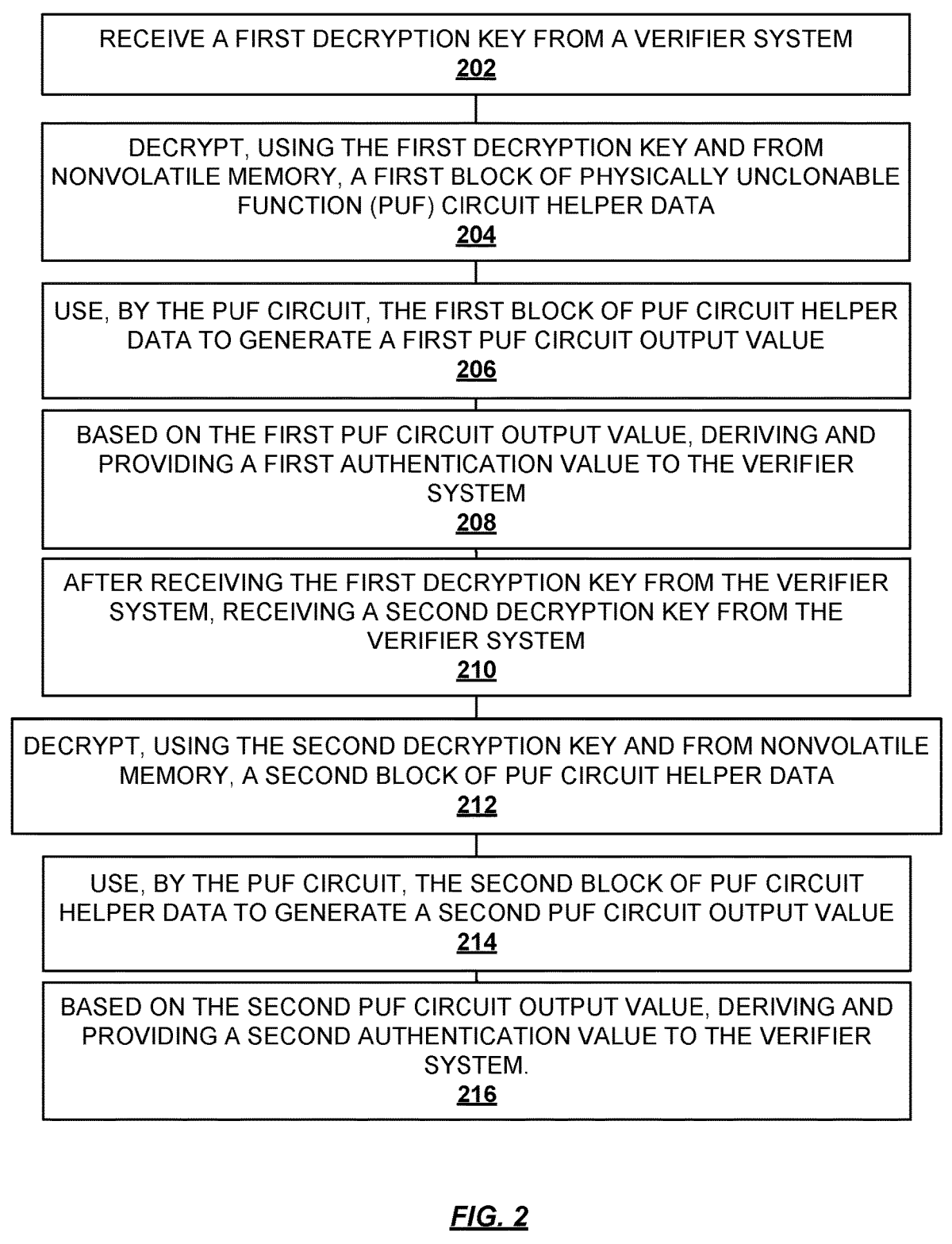

RECEIVE A FIRST DECRYPTION KEY FROM A VERIFIER SYSTEM
202

DECRYPT, USING THE FIRST DECRYPTION KEY AND FROM
NONVOLATILE MEMORY, A FIRST BLOCK OF PHYSICALLY UNCLONABLE
FUNCTION (PUF) CIRCUIT HELPER DATA
204

USE, BY THE PUF CIRCUIT, THE FIRST BLOCK OF PUF CIRCUIT HELPER
DATA TO GENERATE A FIRST PUF CIRCUIT OUTPUT VALUE
206

BASED ON THE FIRST PUF CIRCUIT OUTPUT VALUE, DERIVING AND
PROVIDING A FIRST AUTHENTICATION VALUE TO THE VERIFIER
SYSTEM
208

AFTER RECEIVING THE FIRST DECRYPTION KEY FROM THE VERIFIER
SYSTEM, RECEIVING A SECOND DECRYPTION KEY FROM THE
VERIFIER SYSTEM
210

DECRYPT, USING THE SECOND DECRYPTION KEY AND FROM NONVOLATILE
MEMORY, A SECOND BLOCK OF PUF CIRCUIT HELPER DATA
212

USE, BY THE PUF CIRCUIT, THE SECOND BLOCK OF PUF CIRCUIT
HELPER DATA TO GENERATE A SECOND PUF CIRCUIT OUTPUT VALUE
214

BASED ON THE SECOND PUF CIRCUIT OUTPUT VALUE, DERIVING AND
PROVIDING A SECOND AUTHENTICATION VALUE TO THE VERIFIER
SYSTEM.
216

*FIG. 2*

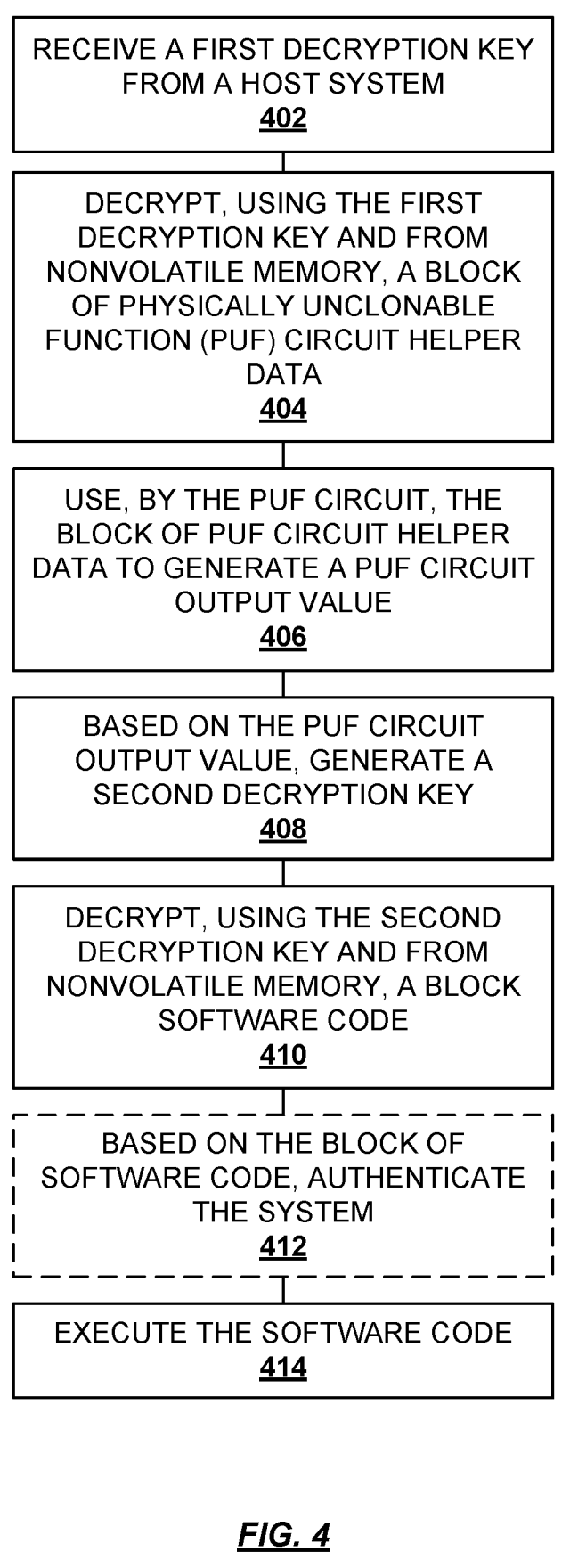

RECEIVE A FIRST DECRYPTION KEY
FROM A HOST SYSTEM
402

DECRYPT, USING THE FIRST
DECRYPTION KEY AND FROM
NONVOLATILE MEMORY, A BLOCK
OF PHYSICALLY UNCLONABLE
FUNCTION (PUF) CIRCUIT HELPER
DATA
404

USE, BY THE PUF CIRCUIT, THE
BLOCK OF PUF CIRCUIT HELPER
DATA TO GENERATE A PUF CIRCUIT
OUTPUT VALUE
406

BASED ON THE PUF CIRCUIT
OUTPUT VALUE, GENERATE A
SECOND DECRYPTION KEY
408

DECRYPT, USING THE SECOND
DECRYPTION KEY AND FROM
NONVOLATILE MEMORY, A BLOCK
SOFTWARE CODE
410

BASED ON THE BLOCK OF
SOFTWARE CODE, AUTHENTICATE
THE SYSTEM
412

EXECUTE THE SOFTWARE CODE
414

*FIG. 4*

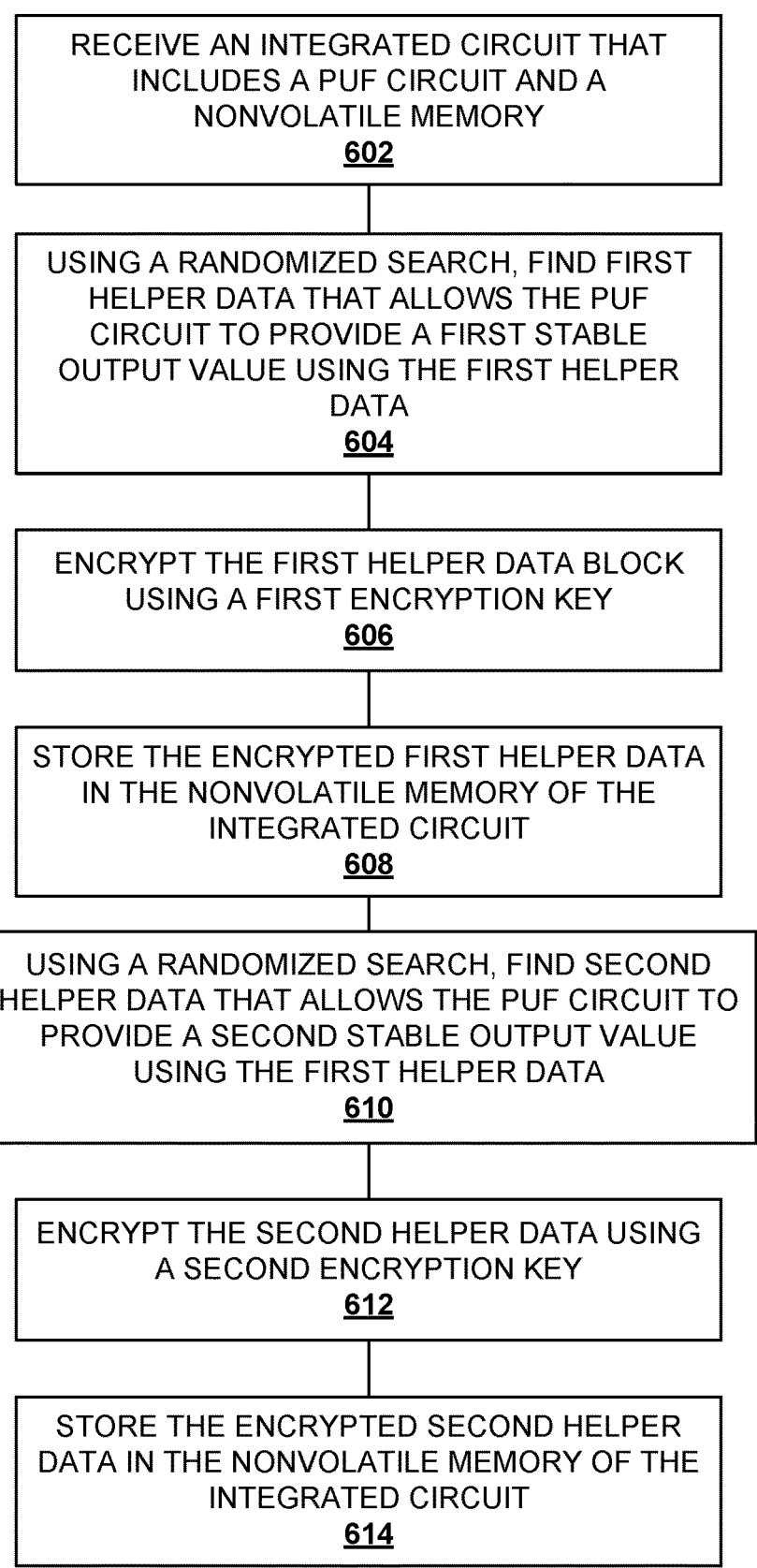

RECEIVE AN INTEGRATED CIRCUIT THAT INCLUDES A PUF CIRCUIT AND A NONVOLATILE MEMORY
602

USING A RANDOMIZED SEARCH, FIND FIRST HELPER DATA THAT ALLOWS THE PUF CIRCUIT TO PROVIDE A FIRST STABLE OUTPUT VALUE USING THE FIRST HELPER DATA
604

ENCRYPT THE FIRST HELPER DATA BLOCK USING A FIRST ENCRYPTION KEY
606

STORE THE ENCRYPTED FIRST HELPER DATA IN THE NONVOLATILE MEMORY OF THE INTEGRATED CIRCUIT
608

USING A RANDOMIZED SEARCH, FIND SECOND HELPER DATA THAT ALLOWS THE PUF CIRCUIT TO PROVIDE A SECOND STABLE OUTPUT VALUE USING THE FIRST HELPER DATA
610

ENCRYPT THE SECOND HELPER DATA USING A SECOND ENCRYPTION KEY
612

STORE THE ENCRYPTED SECOND HELPER DATA IN THE NONVOLATILE MEMORY OF THE INTEGRATED CIRCUIT
614

*FIG. 6*

ENCRYPTED PHYSICALLY UNCLONABLE FUNCTION CIRCUIT HELPER DATA

BRIEF DESCRIPTION OF THE DRAWINGS

FIG. 2 is a flowchart illustrating a method of operating an authentication system.

FIG. 4 is a flowchart illustrating a method of authenticating software code.

FIG. 6 is a flowchart illustrating a method of configuring a system to run authenticated software code.

DETAILED DESCRIPTION OF THE EMBODIMENTS

Figure 1A:
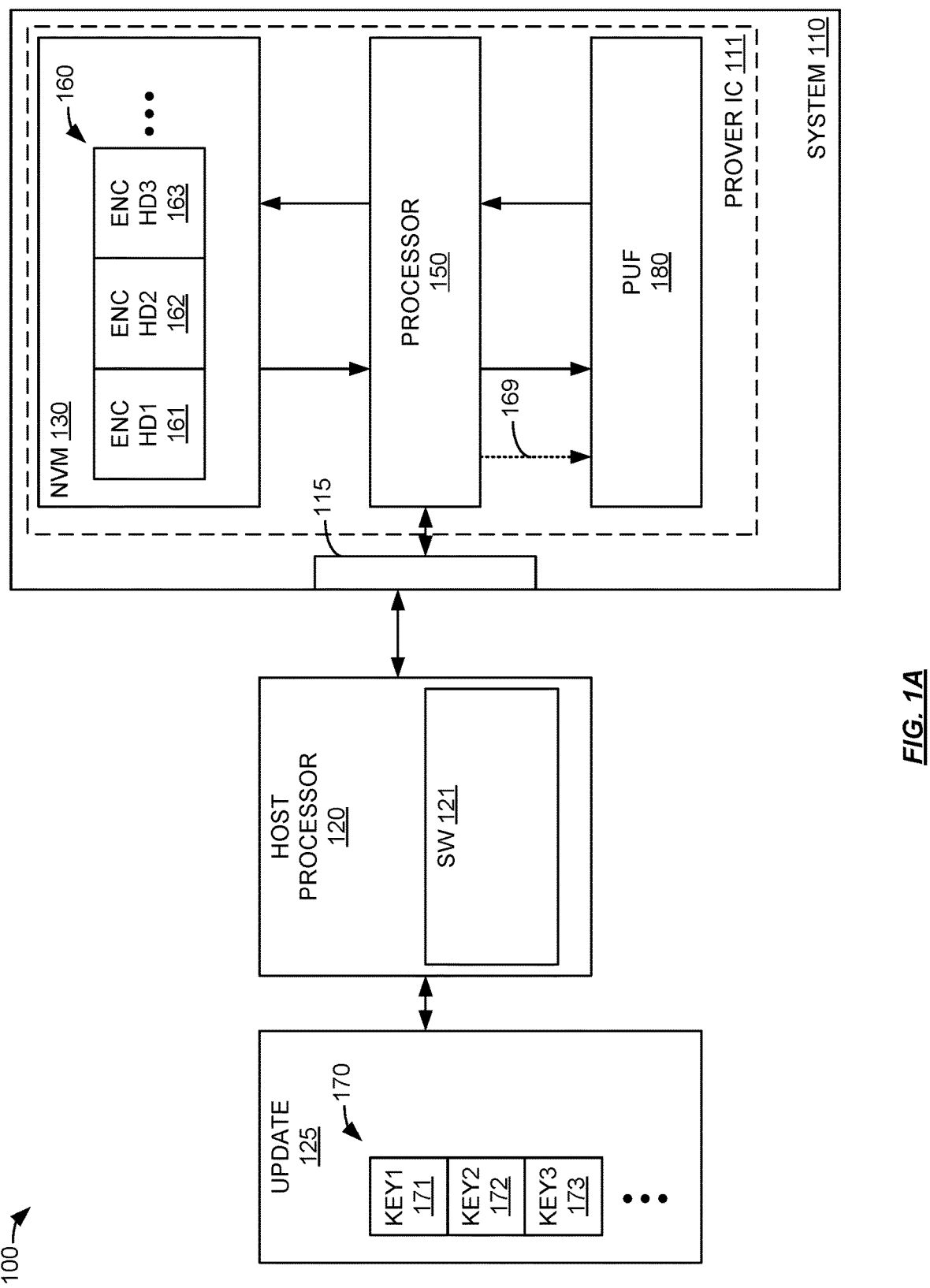
FIGS. 1A-1C illustrate an authentication system.

A "physically unclonable function" (PUF) circuit is a circuit that generates a physically-defined "digital fingerprint" that may serve as a unique identifier for a semiconductor device—such as a microprocessor die. In general, PUF circuits rely on unique physical variations which occur naturally, and inevitably, during integrated circuit manufacturing. Since these variations are smaller than can be reliably generated by classically reproducible circuits, so-called "helper data" is generated for each integrated circuit die with a PUF circuit to ensure the PUF outputs on that die are reproducible over time even though the PUF circuit itself is not.

In an embodiment, multiple helper data solutions (a.k.a., helper data blocks), and therefore multiple possible PUF output values, are generated for a given integrated circuit die. These helper data blocks are encrypted and stored in a nonvolatile memory on the integrated circuit die. In an embodiment, each helper data block is encrypted such that each helper data block can only be decrypted by a decryption key that is different from the other encrypted helper data blocks stored on that integrated circuit die. In other embodiments, each encrypted helper data blocks rely on a different set of decryption keys. For example, the first encrypted data block might require only the first key, while the second block requires both the first and the second, etc.

In an embodiment, a verifying system provides a first key to that allows a first helper data block to be decrypted. The decrypted first helper data block is provided to the PUF circuitry. The PUF circuitry uses this decrypted helper data to produce a first PUF output that is further used during an authentication process between the integrated circuit and the verifying system.

When the first PUF output is compromised by an adversary (or after some arbitrary period of time—e.g., one year), the verifying system is reconfigured. The verifying system is reconfigured to determine authenticity based on a second PUF output value (different from the first) rather than the first PUF output value. The verifying system is also reconfigured to provide a second key (different from the first key) that allows a second encrypted helper data block to be decrypted. Using this decrypted second helper data results in the PUF circuitry producing the second PUF output value.

Thus, an adversary's cloned or counterfeit systems or integrated circuits that only have the (compromised) first PUF output value no longer authenticate correctly with the verifying system after the system has been reconfigured to utilize the second key. However, authentic systems that were originally provisioned with the second encrypted data block are able to produce the second PUF output value and thus be successfully authenticated.

Once a system has been reconfigured to utilize the second key, an adversary is likely to try and obtain the second PUF output value. However, since the second PUF output value is never produced in the field until the second decryption key is provided to the verifying system, the counterfeiter must wait until the verifying system is reconfigured with the second decryption key to begin reverse-engineering. This has two notable effects: (1) an adversary's counterfeits that only have the first PUF output value are rendered non-functional as soon as the verifying system starts to use the second decryption key and second encrypted helper data block, and (2) the adversary must repeat the effort and expense to compromise the second PUF output value. The number of encrypted helper data blocks and associated keys may be made arbitrarily large (within memory constraints) so that a counterfeiter may have to repeat the reverse engineering process many times, multiplying the amount of effort required to continue to counterfeit.

Figure 1B:
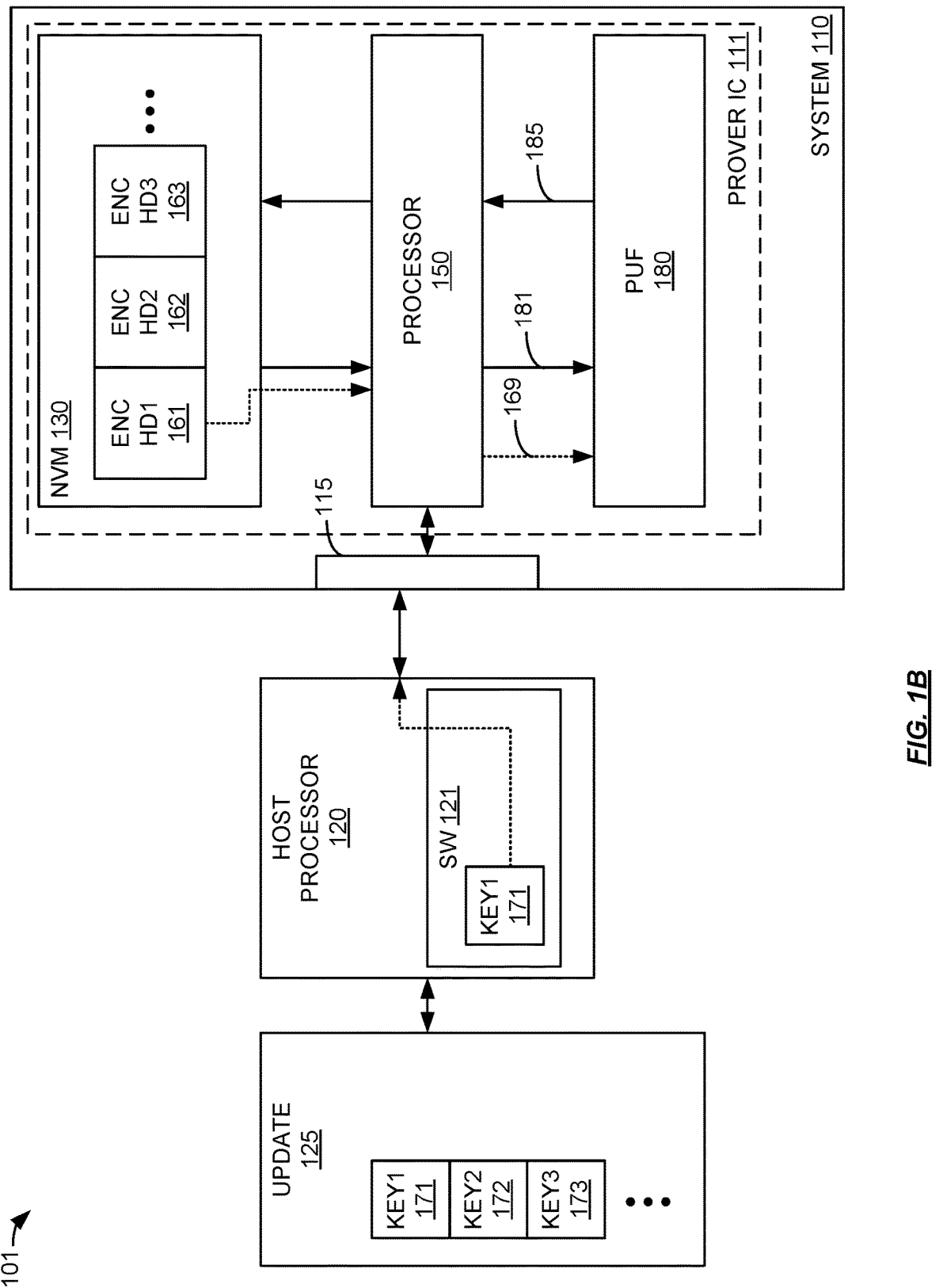
Figure 1C:
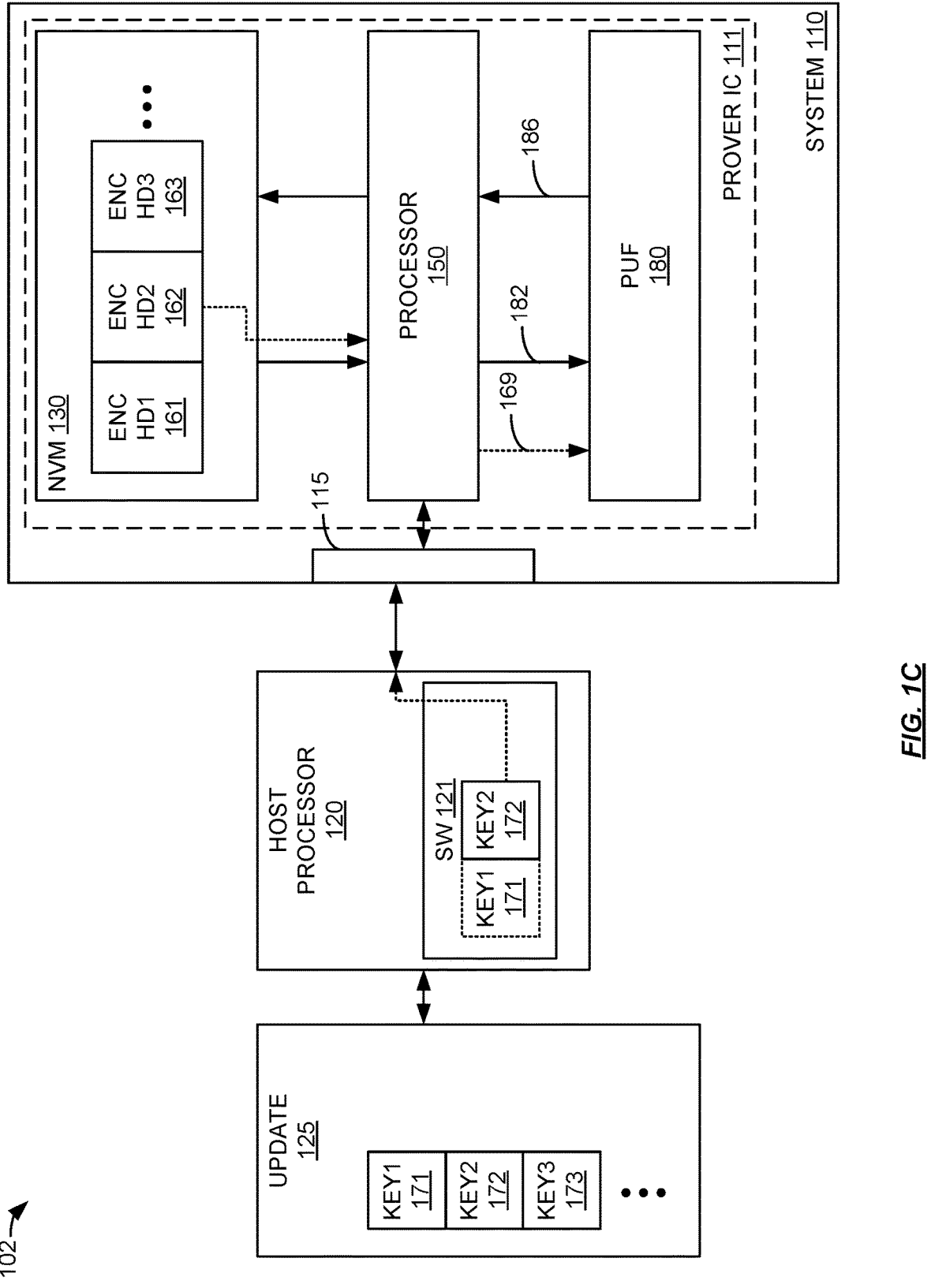

FIGS. 1A-1C illustrate an authentication system. In FIG. 1A, authentication system 100 comprises system 110, host processor 120 and update system 125. System 110 includes nonvolatile memory (NVM) 130, processor 150, physically unclonable function (PUF) circuitry 180, and interface 115. NVM 130, processor 150, and PUF circuitry 180 may be included on an implementation of prover integrated circuit 111. Host processor 120 includes verifier software (or firmware) 121. Update system 125 includes a plurality of decryption keys 171-173.

System 110 is operatively coupled to host processor 120 via interface 115. System 110 is operatively coupled to host processor 120 to at least authenticate system 110 to host processor 120. Host processor includes verifier software 121 to at least verify that system 110 is authentic. System 110 may be, for example, a printer cartridge. Host processor 120 may be part of, for example, a printer that authenticates system 110 to ensure the printer is not using a counterfeit printer cartridge.

Host processor 120 is operatively coupled to update system 125. Host processor 120 is operatively coupled to update system 125 to receive, for example, updates to verifier software 121 and/or additional information to operate a device that includes host processor 120 and/or system 110. Host processor 120 may be operatively coupled to update system 125 via a network (not shown in FIGS. 1A-1C). Host processor 120 may be operatively coupled to update system 125 by any means that can provide communication between host processor 120 and update system 125. In an embodiment, update system 125 is a software process executing on an internet connected server, and the communication between host processor 120 and update system 125 may comprise wired and/or wireless communication networks that include processing nodes, routers, gateways, physical and/or wireless data links for carrying data among various network elements, including combinations thereof, and can include a local area network, a wide area network, and an internetwork (including the Internet). Other elements may be present in to facilitate communication to/from host processor 120 and update system 125 but are omitted for clarity, such as physical media, additional processors, routers, gateways, and physical and/or wireless data links for carrying data.

Processor 150 of system 110 is operatively coupled to NVM 130 and PUF circuitry 180. Processor 150 is operatively coupled to interface 115. Processor 150 may communicate with host processor 120 via interface 115. In an embodiment, PUF circuitry 180, is used to generate a fingerprint value based on chip-unique variations of the physical characteristics (e.g., resistance, capacitance, threshold voltage, connectivity, etc.) of PUF circuitry 180. PUF circuitry 180 may additionally include one or more tamper prevention (i.e., shielding) structures. The physical characteristics depend on random physical factors introduced during manufacturing. This causes the chip-to-chip variations in these physical characteristics to be unpredictable and uncontrollable which makes it virtually impossible to duplicate, clone, or modify PUF circuitry 180 and/or the tamper prevention structures without changing the fingerprint value.

In an embodiment, NVM 130 is provisioned with and stores multiple sets 160 of encrypted helper data blocks 161-163. As described herein, the role of PUF circuitry 180 is to exploit manufacturing variations to derive a chip-unique digital identifier or fingerprint. The fingerprint is thus tied to a specific instance of manufactured PUF circuitry 180. There are many of examples of PUF circuitry, and many of them are arranged to produce a noisy bit string either on its own or after having an optional challenge stimulus 169 (e.g., voltage, current, digital value, etc.) provided to it. The noisy bit stream is typically referred to as a PUF response. The stimulus is typically referred to as a PUF challenge (a.k.a., PUF challenge stimulus). For example, PUF circuitry 180 may be controlled or 'challenged' to produce a noisy bit string. When PUF circuitry 180 is challenged multiple times, PUF circuitry 180 may produce different noisy bit streams one or more times. Resolving the differences in these noisy bit streams to a single, stable fingerprint value that is output by PUF circuitry 180 is resolved using helper data. Helper data may include, for example, stable bit indicators, error correcting code(s), etc. Helper data is more formally defined in Armkenecht et al., "A Formal Foundation for the Security Features of Physical Functions" Proceedings 2011 IEEE Symposium on Security and Privacy, pages 397-412, 2011, which is hereby incorporated herein by reference for all purposes.

In an embodiment at least partially illustrated in FIG. 1B, host processor 120 running verifier software 121 is provisioned with a first decryption key 171. Host processor 120 may be provided decryption key 171 by update system 125. Host processor 120 may be provided decryption key 171 by an initial configuration/manufacturing system not shown in FIGS. 1A-1C. Prior or near the start of an authentication sequence, decryption key 171 is communicated to processor 150 by verifier software 121 running on the host processor 120 via interface 115. Processor 150 uses decryption key 171 to decrypt the encrypted helper data block 161. Note that as described herein, decryption key 171 cannot be used to decrypt the other encrypted helper data blocks 162-163, because the host processor 120 is not provided the decryption keys 172-173 that decrypt other encrypted helper data blocks 162-163. Note that in alternative embodiments, one of the helper data blocks (e.g., helper data block 161) might be stored in unencrypted format, and only subsequent blocks (e.g., encrypted helper data blocks 162-163) are stored in encrypted format. This might be done, for example, so that the adversary who analyzes the initial silicon (which utilizes the unencrypted helper data block) is not aware that any decryption process is required for subsequent data blocks.

As described herein, verifier software 121 running on a host processor 120 provides decryption key 171 to system 110 via interface 115. As discussed herein, decryption key 171 is "1 of N", where "N" is at least 2. Using the first decryption key 171, processor 150 decrypts encrypted helper data block 161. Processor 150 provides the decrypted helper data (a.k.a., decrypted version) to PUF circuitry 180. Using the first decrypted helper data, the PUF circuitry 180 generates a first PUF output value associated with the first helper data block. Processor 150 uses this first PUF output value, either alone or in conjunction with other key data (e.g., received from the NVM core), as part of an authentication process. In particular, processor 150 uses this first PUF output value to authenticate system 110 to host processor 120 running verifier software 121.

There are many approaches by which the PUF output value may be used in the authentication process. For example, the first PUF output value could be used as a private key (or as an input to a private key derivation process), and the verifier software 121 might utilize a challenge/response protocol (e.g., similar to the public/private authentication process used by the standard "SSH" protocol) to verify authenticity of system 110. Other approaches might rely on symmetric or pre-shared keys rather than public/private keys, where the PUF output could again be used either as the key, as the shared secret, or as an input to a key/secret derivation process. Other approaches might selectively enable or disable different subsystems within system 110, based on the PUF output value. In general, the use of encrypted helper data blocks as described herein can be made compatible with any authentication process that itself is compatible with PUF technology.

Because verifier software 121 initially is not provided with decryption keys 172-173 for encrypted helper data blocks 162-163, an adversary cannot decrypt the "N-1" helper data blocks 162-163. In other words, even if an adversary were to fully compromise the NVM of system 110 and thereby know all of its contents, the adversary cannot determine a second PUF output value that is associated with encrypted helper data block 162 until verifier software 121 is provided with decryption key 172 (which is then provided to authentication system 100). Likewise, an adversary cannot determine a third PUF output value that is associated with encrypted helper data block 163 until verifier software 121 is provided with decryption key 173, and so on.

Thus, for example, if an adversary obtains the first PUF output value that is associated with encrypted helper data block 161, plus all of the NVM contents (including the encrypted helper data blocks 162 and 163) and ships a compatible clone of system 110, verifier software 121 running on host processor 120 may be updated (e.g., via update system 125) to start using a different decryption key 172-173 that decrypts a different encrypted helper data block 161-163. The cloned chips will then no longer be compatible. Even though the adversary has copies of the encrypted helper data block(s) 161-163 from NVM, that data is useless in a compatible part, because unlike NVM contents, the PUF circuitry 180 itself is unclonable.

This process is further illustrated with reference to FIG. 1B and FIG. 1C. In FIG. 1B, authentication system 101 includes verifier software 121 that has been provisioned with decryption key 171 which may be used to decrypt encrypted helper data block 161. Verifier software 121 is not provisioned with decryption key 172 which may be used to decrypt encrypted helper data block 162 or decryption key 173 which may be used to decrypt encrypted helper data block 163.

In an embodiment, decryption key 171 is provided to system 110 as part of an authentication process (illustrated in FIG. 1B by the dotted line arrow from key1 171). In other embodiments, decryption key 171 is provided to system 110 prior to an authentication process (e.g., as part of a power-on or reset process). Processor 150 uses decryption key 171 to decrypt a first encrypted helper data block 161. The first decrypted helper data block 181 is provided to PUF circuitry 180. A challenge stimulus 169 may optionally be provided to PUF circuitry 180. In an embodiment, challenge stimulus 169 may have been decrypted from encrypted helper data block 161, another encrypted source in NVM 130, and/or verifier software 121. In other words, a combination of helper data block 181 and challenge stimulus 169 may be encrypted and stored in NVM 130. The challenge stimulus 169, whether from verifier software 121 or NVM 130 allows PUF circuitry 180 to produce multiple different fingerprint values while using the same decrypted helper data block 181. These multiple different fingerprint values may be used by software 121 as part of the authentication scheme.

PUF circuitry 180, using the first decrypted helper data block 181, generates a first PUF output value 185. PUF circuitry 180 provides the first PUF output value 185 to processor 150. As described herein, processor 150 may use the first PUF output value 185 in an authentication process between system 110 and the host processor 120 running verifier software 121.

In FIG. 1C, authentication system 102 includes verifier software 121 that has been provisioned with a second decryption key 172 which may be used to decrypt encrypted helper data block 162. Verifier software 121 may optionally be provisioned with the first decryption key 171 which may be used to decrypt encrypted helper data block 161. Verifier software 121 is not provisioned with decryption key 173 which may be used to decrypt encrypted helper data block 163.

In an embodiment, decryption key 172 is provided to system 110 as part of an authentication process (illustrated in FIG. 1C by the dotted line arrow from key2 172). In other embodiments, encryption key 172 is provided to system 110 prior to an authentication process (e.g., as part of a power-on or reset process). Processor 150 uses decryption key 172 to decrypt a second encrypted helper data block 162. The second decrypted helper data block 182 is provided to PUF circuitry 180. A challenge stimulus 169 may optionally be provided to PUF circuitry 180. In an embodiment, challenge stimulus 169 may have been decrypted from encrypted helper data block 162, another encrypted source in NVM 130, and/or verifier software 121. In other words, a combination of helper data block 182 and challenge stimulus 169 may be encrypted and stored in NVM 130. The challenge stimulus 169, whether from verifier software 121 or NVM 130 allows PUF circuitry 180 to produce multiple different fingerprint values while using the same decrypted helper data block 182. These multiple different fingerprint values may be used by software 121 as part of the authentication scheme.

PUF circuitry 180, using the second decrypted helper data block 182, generates a second PUF output value 186. PUF circuitry 180 provides the second PUF output value 186 to processor 150. As described herein, processor 150 can use the second PUF output value 186 in an authentication process between system 110 and the host processor 120 running verifier software 121.

FIG. 2 is a flowchart illustrating a method of operating an authentication system. Steps illustrated in FIG. 2 may be performed by one or more of authentication system 100, authentication system 101, authentication system 102, and/ or their components. A first decryption key is received from a verifier system (202). For example, system 110 may receive, from host processor 120 running verifier software 121, a first decryption key 171 that may be used to decrypt encrypted helper data block 161, but not be used to decrypt other encrypted helper data blocks 162-163. Note that in some embodiments, subsequent encrypted helper data blocks 162-163 rely on a set of decryption keys that includes first decryption key 171. For example, encrypted data block 161 might require only a first decryption key 171, while the second block 162 requires both the first decryption key 171 and a second key value, etc.

Using the first decryption key, decrypt a first block of physically unclonable function (PUF) circuit helper data that is from nonvolatile memory (204). For example, using the first decryption key 171, processor 150 may retrieve encrypted helper data block 161 from nonvolatile memory 130 and decrypt encrypted helper data block 161. By the PUF circuitry, the first block of PUF circuit helper data is used to generate a first PUF circuit output value (206). For example, PUF circuitry 180 may use decrypted helper data block 181 to produce a first PUF output value 185.

Based on the first PUF circuit output value, a first authentication value is derived and provided to the verifier system (208). For example, based on PUF output value 185, processor 150 may provide an authentication value to host processor 120 running verifier software 121. The authentication value may be, for example, a decrypted value, an encrypted value, a token, a keysplit value, the result of a challenge/response protocol, etc. that is used to authenticate system 110. In an embodiment, the first PUF circuit output value contributes, either on its own or in conjunction with other data, to the generation or derivation of either a secret key or private key that is itself used during a challenge/ response protocol to produce the first authentication value.

After receiving the first decryption key from the verifier system, a second decryption key is received from the verifier system (210). For example, after receiving decryption key 171, system 110 may receive, from host processor 120 running verifier software 121, a second decryption key 172 that may be used to decrypt encrypted helper data block 162, but not be used to decrypt other encrypted helper data blocks 161 or 163. In an example, verifier software 121 is provisioned with a second decryption key 172 after the first PUF output value 185 has been compromised or otherwise determined by an adversary and/or counterfeiter. This second decryption key 172 is then provided to system 110 as part of an authentication process instead of the first decryption key 171. In another example, verifier software 121 is provisioned with a second decryption key 172 after a selected period of time (e.g., one year). After that selected period of time this second decryption key 172 is then provided to system 110 as part of an authentication process instead of the first decryption key 171. Note that in some embodiments, after system 110 receives the second decryption key 172, the authentication process may rely on both the first decryption key 171 and the second decryption key 172.

Using the second decryption key, decrypt a second block of PUF circuit data that is from nonvolatile memory (212). For example, using the second decryption key 172, processor 150 may retrieve encrypted helper data block 162 from nonvolatile memory 130 and decrypt encrypted helper data block 162. By the PUF circuitry, the second block of PUF circuit helper data is used to generate a second PUF circuit output value (214). For example, PUF circuitry 180 may use decrypted helper data block 182 to produce a second PUF output value 186.

Based on the second PUF circuit output value, a second authentication value is derived and provided to the verifier system (216). For example, based on PUF output value 186, processor 150 may provide an authentication value to host processor 120 running verifier software 121. The authentication value may be, for example, a decrypted value, an encrypted value, a token, a keysplit value, the result of a challenge/response protocol, etc. that is used to authenticate system 110. In an embodiment, the second PUF circuit output value contributes, either on its own or in conjunction with other data, to the generation or derivation of either a secret key or private key that is itself used during a challenge/response protocol to produce the second authentication value.

Thus, counterfeit systems/integrated circuits that have only copied the first PUF output value 185 no longer result in the verifying host processor 120 indicating that these counterfeits are authentic. However, authentic systems 110 that have been provisioned with the second encrypted helper data block 162 are able to produce the second PUF output value 186 and be authenticated.

An adversary is likely to try and obtain the second PUF output value 186. However, since the second PUF output value 186 is never produced in the field until the second decryption key 172 is provided to verifier software 121, the adversary must wait until the verifier software 121 is reconfigured with the second decryption key 172 to begin reverse-engineering system 110. Thus, counterfeits that only have the first PUF output value 185 are rendered non-functional as soon as verifier software 121 starts to use the second decryption key 172 and the second encrypted helper data block 162. Also, the adversary must repeat the effort and expense used to compromise the first PUF output value 185 in order to compromise the second PUF output value 186. The number of encrypted helper data blocks 161-163 and associated decryption keys 171-173 may be made arbitrarily large so that a counterfeiter may have to repeat the reverse engineering process many times thereby multiplying the effort required to continue to counterfeit by a corresponding number.

Figure 3A:
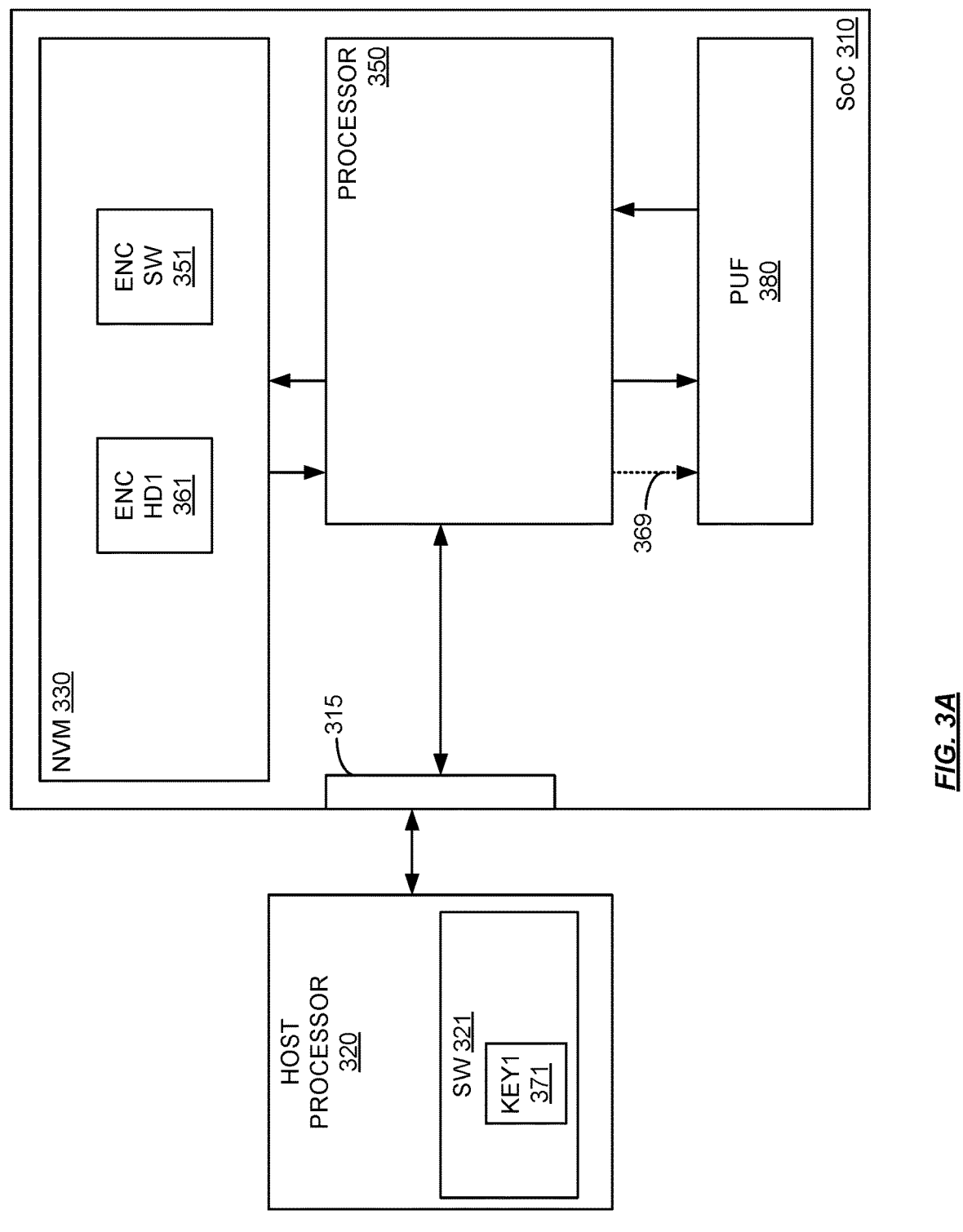
FIGS. 3A-3D illustrate a system that authenticates software code.

In addition to being able to ensure that system 110 has not been cloned by an adversary, the encrypted helper data concept can be alternatively used to ensure that firmware within an authentic system has not been copied into an unauthorized, compatible system. FIGS. 3A-3D illustrate a system that authenticates software code. In FIG. 3A, system 300 comprises system 310 and host processor 320. Verifier software 321 running within host processor 320 is provisioned with helper data decryption key 371. System 310 includes nonvolatile memory (NVM) 330, processor 350, physically unclonable function (PUF) circuitry 380, and interface 315. Nonvolatile memory 330 is provisioned with and stores encrypted helper data block 361 and encrypted embedded software 351. Nonvolatile memory 330 also includes embedded software (a.k.a., firmware) that implements the normal functionality of system 310.

System 310 is operatively coupled to host processor 320 via interface 315. System 310 may optionally authenticate system 310 to host processor 320. Processor 350 of system 310 is operatively coupled to NVM 330 and PUF circuitry 380. Processor 350 is operatively coupled to interface 315. Processor 350 may communicate with host processor 320 via interface 315. In an embodiment, PUF circuitry 380 is used to generate a fingerprint value in the same manner as described herein with reference to PUF circuitry 180.

In an embodiment, NVM 330 is provisioned with and stores encrypted helper data block 361 and encrypted software 351. Host processor 320 running software 321 is provisioned with a helper data decryption key 371. Host processor 320 may be provided helper data decryption key 371 by an initial configuration/manufacturing system (not shown in FIGS. 3A-3D), an update process, and/or an upgrade process. Helper data decryption key 371 decrypts encrypted helper data block 361. Helper data decryption key 371 does not decrypt encrypted software 351. Host processor 320 is not provided a key to decrypt encrypted software 351.

Software 321 running on a host processor 320 provides helper data decryption key 371 to system 310 via interface 315. Using the helper data decryption key 371, processor 350 decrypts encrypted helper data block 361. Processor 350 provides this decrypted helper data to PUF circuitry 380. Using the decrypted helper data, PUF circuitry 380 generates a PUF output value. Processor 350 uses this PUF output value, either alone or in conjunction with other key data (e.g., received from the NVM core), to decrypt (and optionally execute) encrypted software 351. An adversary who has simply copied the NVM 330 contents of an authentic system and installed those contents in a compatible (but unauthorized) system, cannot correctly decrypt the encrypted software 351 within the copied contents, because that decryption process requires the PUF output value—which is specific to system 310 and encrypted helper data block 361. In this way, PUF circuits and encrypted helper data blocks can be used to ensure that authentic firmware cannot be copied into compatible but unauthorized systems.

Figure 3B:
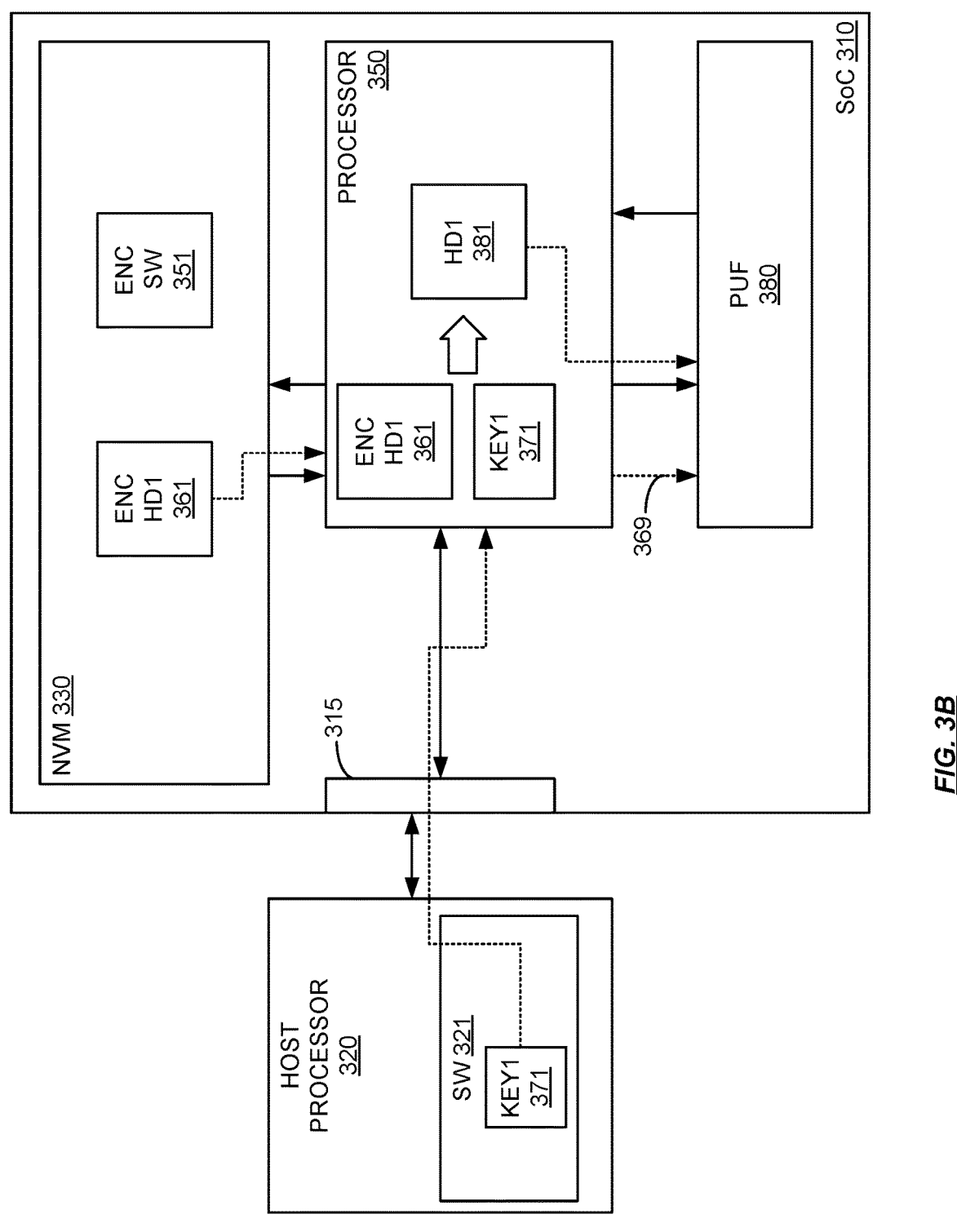

This process is further illustrated with reference to FIG. 3B and FIG. 3C. In FIG. 3B, system 301 includes software 321 that has been provisioned with helper data decryption key 371 which may be used to decrypt encrypted helper data block 361. Note that software 321 is not provisioned with a decryption key which may be used to directly decrypt encrypted software 351. Instead, helper data decryption key 371 can only be used to decrypt the encrypted helper data block 361, which in turn can be used to generate a PUF output that can then be used to decrypt encrypted software 351.

As illustrated in FIG. 3B, helper data decryption key 371 is provided to system 310 (illustrated in FIG. 3B by the dotted line arrow from key1 371) which are operatively coupled. Processor 350 uses helper data decryption key 371 to decrypt an encrypted helper data block 361. The decrypted helper data block 381 is provided to PUF circuitry 380. A challenge stimulus 369 may optionally be provided to PUF circuitry 380. In an embodiment, challenge stimulus 369 may have been decrypted from encrypted helper data block 361 or another encrypted source in NVM 330 and/or software 321.

Figure 3C:
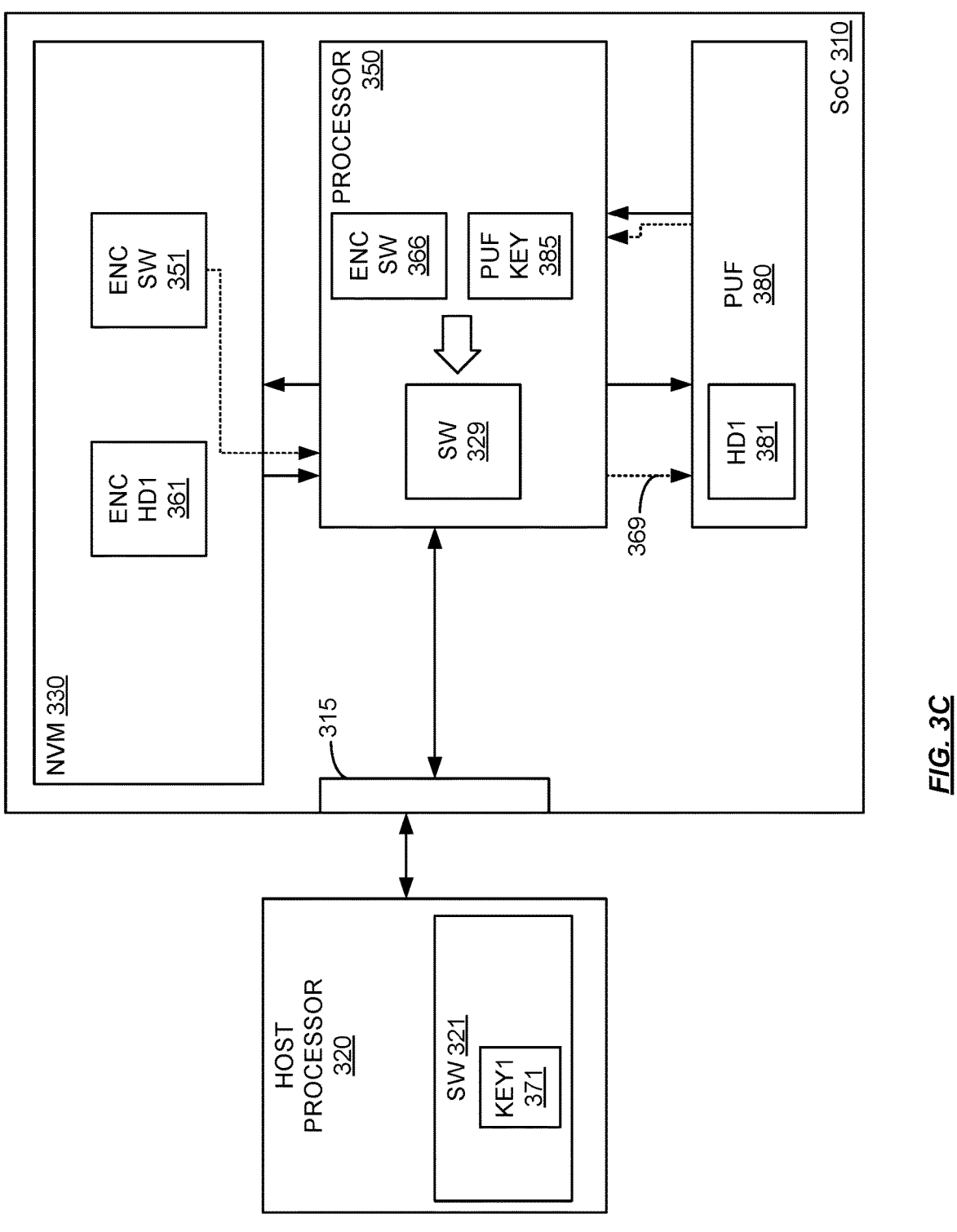

In FIG. 3C, PUF circuitry 380, using the decrypted helper data block 381, generates a PUF output value 385. PUF circuitry 380 provides the PUF output value 385 to processor 350. In an embodiment, processor 350 may now use the PUF output value 385 as a key to decrypt encrypted software 351. In another embodiment, processor 350 may use the PUF output value 385 as a keysplit, or otherwise in a derivation process that generates the key which decrypts encrypted software 351 based on PUF output value 385. In an embodiment, the decrypted software 329 may now be executed by processor 350. Decrypted software 329 may be used by software 321 to authenticate system 310. For example, software 329 could be used to configure the operation of system 310, including an authentication message returned to verifier software 321. In another embodiment, decrypted software 329 is returned to the host processor 320 where it is executed.

Figure 3D:
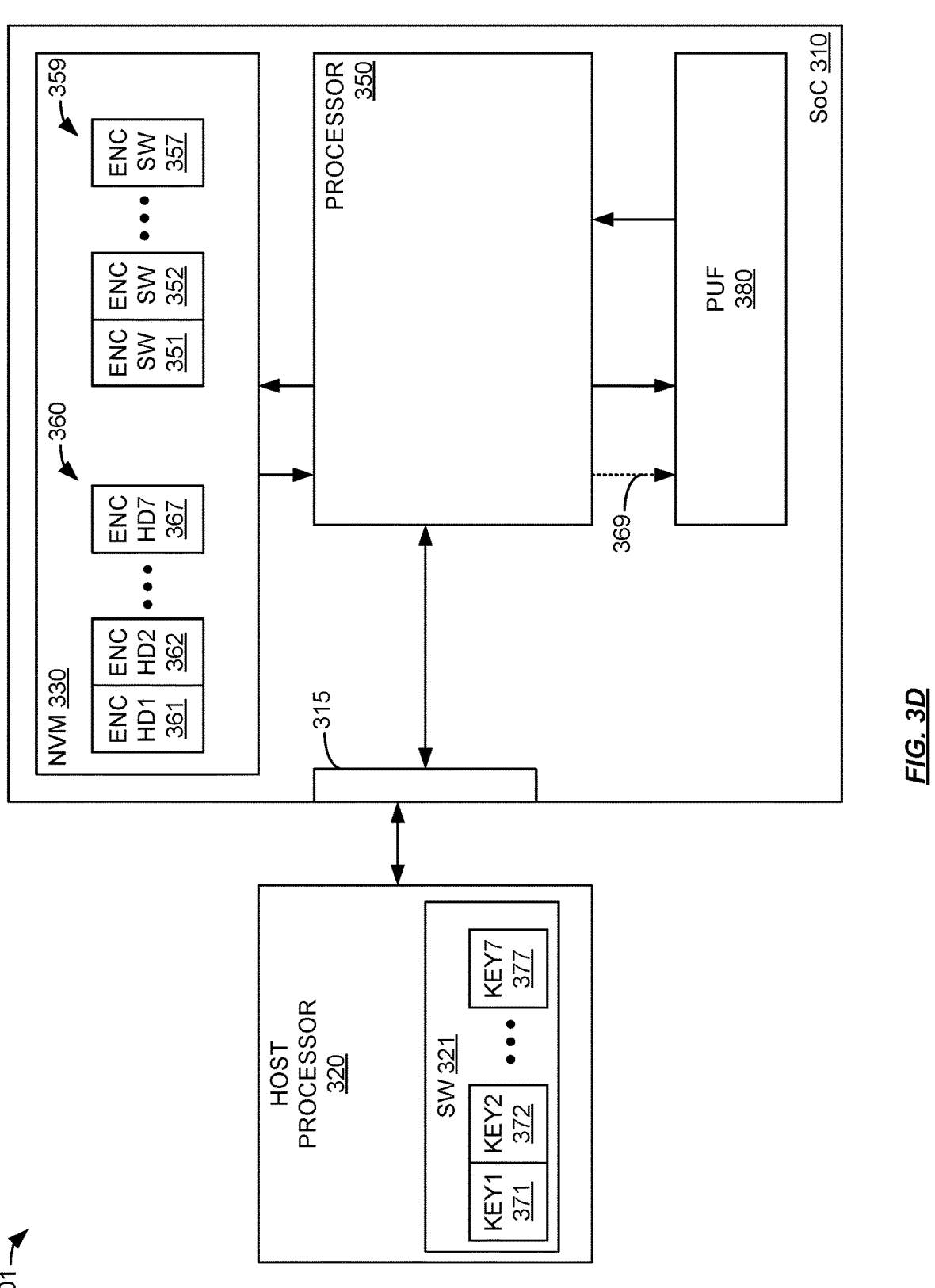

FIGS. 3A-3C illustrate a system whereby one block of encrypted software 351 is decrypted based on one PUF output value 385 that is a result of using one decrypted helper data block 361. FIG. 3D illustrates a system where multiple blocks 360 of encrypted helper data 361-362 may be used in conjunction with multiple helper data decryption keys 371-372 to decrypt multiple blocks 359 of encrypted software 351-357. It should also be understood that the multiple helper data decryption keys 371-377 may be released to host processor 320 one at a time over time to discourage counterfeiting in a manner similar to the authentication system described with reference to FIGS. 1A-1C and FIG. 2. For example, an adversary might copy all of the firmware within an authentic system 310, and include a decrypted version of software 329 to ensure compatibility. These cloned systems will authenticate correctly until (e.g., after one year) the verifier software authenticates the compatible system using a new helper data decryption key 372-377 (corresponding to new encrypted helper data blocks 362-367).

FIG. 4 is a flowchart illustrating a method of authenticating software code. Steps illustrated in FIG. 4 may be performed by one or more of system 300, system 301, and/or their components. A first decryption key is received from a host system (402). For example, system 310 may receive, from host processor 320 running software 321, a helper data decryption key 371 that may be used to decrypt encrypted helper data block 361, but not be used to decrypt encrypted software 351.

Using the decryption key, decrypt a block of physically unclonable function (PUF) circuit helper data that is from nonvolatile memory (404). For example, using the helper data decryption key 371, processor 350 may retrieve encrypted helper data block 361 from nonvolatile memory 330 and decrypt encrypted helper data block 361. By the PUF circuitry, the first block of PUF circuit helper data is used to generate a PUF circuit output value (406). For example, PUF circuitry 380 may use decrypted helper data block 381 to produce a PUF output value 385.

Based on the PUF circuit output value, a second decryption key is generated (408). For example, based on PUF output value 385, processor 350 may derive a decryption key that can be used to decrypt encrypted software 351.

Using the second decryption key, an encrypted block software code that is from nonvolatile memory is decrypted (410). For example, using the PUF output values 385 as a second decryption key, processor 350 may retrieve encrypted software 351 from nonvolatile memory 330 and decrypt encrypted software 351 to produce decrypted software 329. Optionally, based on the block of software code, the system is authenticated (412). For example, based on decrypted software 329, software 321 may verify that system 310 is authentic. This verification may be based on a property of decrypted software 329 (such as a checksum) and/or the functionality of decrypted software 329 (e.g., correct response to a challenge token, etc.). The software code is executed (414). For example, processor 350 and/or host processor 320 may execute decrypted software 329.

Figure 5:
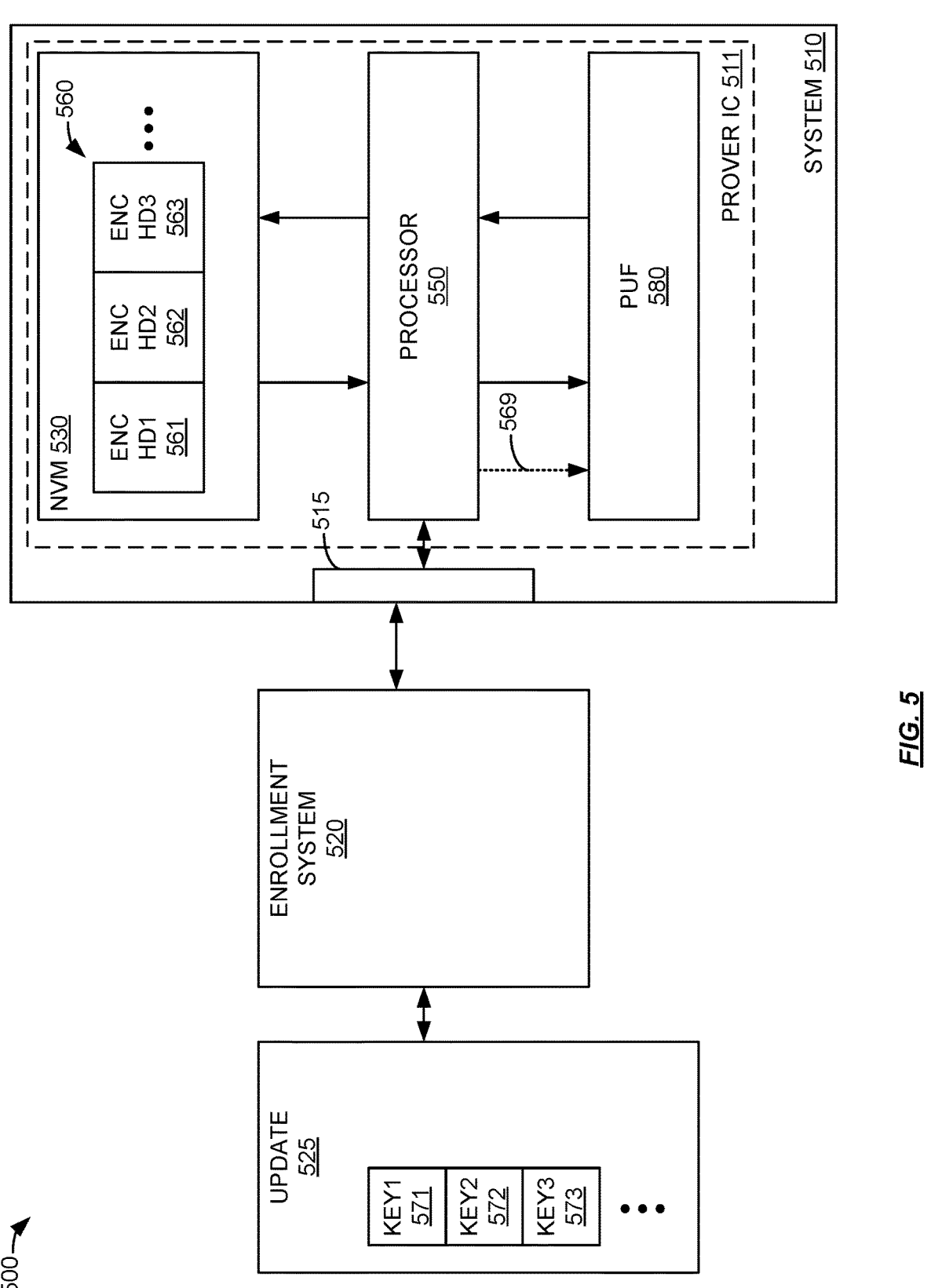
FIG. 5 illustrates a system for configuring an authentication device.

FIG. 5 illustrates a system for configuring an authentication device. In FIG. 5, configuration system 500 comprises system 510, enrollment system 520, and update system 525. System 510 includes nonvolatile memory (NVM) 530, processor 550, physically unclonable function (PUF) circuitry 580, and interface 515. In an embodiment, NVM 530, processor 550, and PUF circuitry 580 may be included on an implementation of integrated circuit 511 (e.g., an authentication chip) within system 510 (e.g., a printer cartridge). Update system 525 is provided (or generates) a plurality of encryption keys 571-573.

System 510 is operatively coupled to enrollment system 520 via interface 515. Enrollment system 520 is operatively coupled to system 510 to calculate or otherwise find multiple helper data solutions to be stored within system 510 in encrypted form.

Enrollment system 520 (e.g., tester hardware used during device manufacture) is operatively coupled to update system 525 (e.g., a LAN-connected server capable of providing security keys to one or more tester hardware platforms). Enrollment system 520 is operatively coupled to update system 525 to receive, for example, encryption keys 571-573 to encrypt multiple helper data blocks associated with PUF circuitry 580. These encrypted helper data blocks 561-563 are stored in NVM 530.

Processor 550 of system 510 is operatively coupled to NVM 530 and PUF circuitry 580. Processor 550 is operatively coupled to interface 515. Processor 550 may communicate with enrollment system 520 via interface 515. In an embodiment, enrollment system 520 instructs PUF circuitry 580 to search for multiple helper data solutions that allow PUF circuitry 580 to generate multiple stable fingerprint values based on chip-unique variations of the physical characteristics (e.g., resistance, capacitance, threshold voltage, connectivity, etc.) of PUF circuitry 580. PUF circuitry 580 may include one or more tamper prevention (i.e., shielding) structures. The physical characteristics depend on random physical factors introduced during manufacturing. This causes the chip-to-chip variations in these physical characteristics to be unpredictable and uncontrollable which makes it virtually impossible to duplicate, clone, or modify PUF circuitry 580 and/or the tamper prevention structures without changing the fingerprint value.

In an embodiment, enrollment system 520 instructs processor 550 to store multiple blocks 560 of encrypted helper data blocks 561-563 within NVM 530. PUF circuitry 580 exploits manufacturing variations to derive a digital identifier or fingerprint. The fingerprint is thus tied to a specific instance of manufactured PUF circuitry 580. PUF circuitry 580 is arranged to produce a noisy bit string either on its own or after having an optional stimulus 569 (e.g., voltage, current, digital value, etc.) provided to it. The noisy bit stream is typically referred to as a PUF response. The stimulus is typically referred to as a PUF challenge (a.k.a., PUF challenge stimulus).

In an embodiment, system 510 is provisioned by enrollment system 520 with a first encrypted helper data block that can be decrypted using decryption key 571. Enrollment system 520 (e.g., a manufacturing tester) may be provided decryption key 571 by update system 525 (e.g., a manufacturing tester LAN-connected server). In an embodiment, decryption key 571 does not decrypt the other encrypted helper data blocks 562-563. System 510 is also provisioned by enrollment system 520 with an encrypted helper data blocks 562-563 that can be decrypted using decryption key 572-573, respectively. Enrollment system 520 may be provided decryption keys 572-573 by update system 525. In an embodiment, decryption keys 572-573 do not decrypt the other encrypted helper data blocks 562-563 that are not associated with that respective decryption key 571-573. In other embodiments, subsequent encrypted helper data blocks 562-563 rely on a set of decryption keys that includes first decryption key 571. For example, encrypted data block 561 might require only a first decryption key 571, while the second block 562 requires both the first decryption key 571 and the second decryption key 572, etc.

FIG. 6 is a flowchart illustrating a method of enrolling a system with multiple encrypted helper data images, either for authentication reasons or to run authenticated software code. Steps illustrated in FIG. 6 may be performed by one or more of configuration system 500, and/or its components. An integrated circuit that include a PUF circuit and a nonvolatile memory is received (602). For example, configuration system 500 may receive an instance of a system 510 (e.g., a printer cartridge) that includes an instance of integrated circuit 511 (e.g., an authentication IC).

Using a randomized search, find first helper data that allows the PUF circuit to provide a first stable output value using the first helper data (604). For example, enrollment system 520 may use a randomized search to find a first helper data block that produces a first stable output value from PUF circuitry 580. The first helper data block is encrypted using a first encryption key (606). For example, the first helper data block may be encrypted using a first encryption key to produce encrypted helper data block 561. The encrypted first helper data is stored in the nonvolatile memory of the integrated circuit (608). For example, enrollment system 520 may control or instruct system 510 to store encrypted helper data block 561 in NVM 530. In an embodiment, the encryption and decryption keys are the same (i.e., symmetric encryption). In another embodiment, the encryption and decryption keys are different (i.e., asymmetric encryption).

Using a randomized search, find second helper data that allows the PUF circuit to provide a second stable output value using the second helper data (610). For example, enrollment system 520 may use a randomized search to find a second helper data block that produces a second stable output value, different from the first stable output value, from PUF circuitry 580. The second helper data block is encrypted using a second encryption key (612). For example, the second helper data block may be encrypted using encryption key 572 to produce encrypted helper data block 562. The encrypted second helper data is stored in the nonvolatile memory of the integrated circuit (614). For example, enrollment system 520 may control or instruct system 510 to store encrypted helper data block 562 in NVM 530.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of authentication system 100, authentication system 101, authentication system 102, system 300, and/or configuration system 500, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 7:
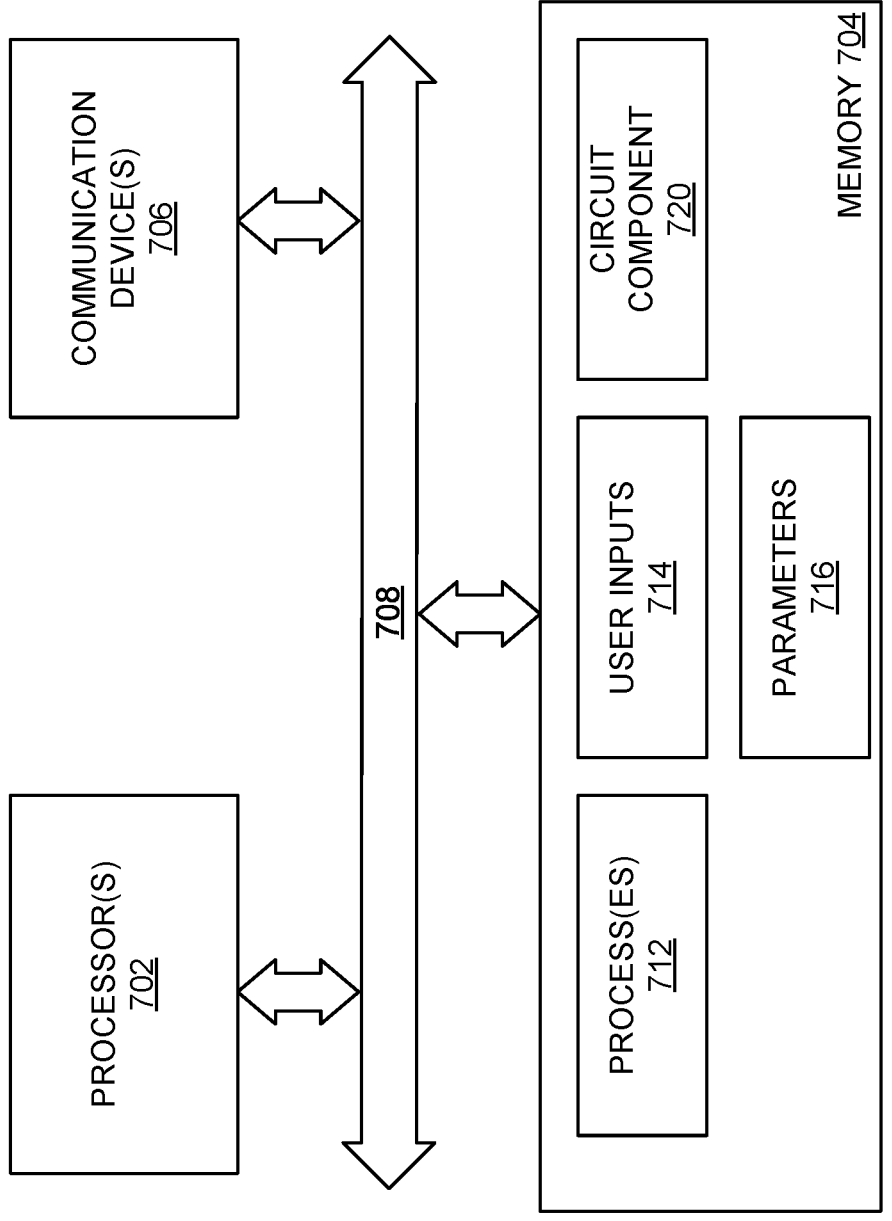
FIG. 7 is a block diagram illustrating a processing system.

FIG. 7 is a block diagram illustrating one embodiment of a processing system 700 for including, processing, or generating, a representation of a circuit component 720. Processing system 700 includes one or more processors 702, a memory 704, and one or more communications devices 706. Processors 702, memory 704, and communications devices 706 communicate using any suitable type, number, and/or configuration of wired and/or wireless connections 708.

Processors 702 execute instructions of one or more processes 712 stored in a memory 704 to process and/or generate circuit component 720 responsive to user inputs 714 and parameters 716. Processes 712 may be any suitable electronic design automation (EDA) tool or portion thereof used to design, simulate, analyze, and/or verify electronic circuitry and/or generate photomasks for electronic circuitry. Representation 720 includes data that describes all or portions of authentication system 100, authentication system 101, authentication system 102, system 300, and/or configuration system 500, and their components, as shown in the Figures.

Representation 720 may include one or more of behavioral, register transfer, logic component, transistor, and layout geometry-level descriptions. Moreover, representation 720 may be stored on storage media or communicated by carrier waves.

Data formats in which representation 720 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 714 may comprise input parameters from a keyboard, mouse, voice recognition interface, microphone and speakers, graphical display, touch screen, or other type of user interface device. This user interface may be distributed among multiple interface devices. Parameters 716 may include specifications and/or characteristics that are input to help define representation 720. For example, parameters 716 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 704 includes any suitable type, number, and/or configuration of non-transitory computer-readable storage media that stores processes 712, user inputs 714, parameters 716, and circuit component 720.

Communications devices 706 include any suitable type, number, and/or configuration of wired and/or wireless devices that transmit information from processing system 700 to another processing or storage system (not shown) and/or receive information from another processing or storage system (not shown). For example, communications devices 706 may transmit circuit component 720 to another system. Communications devices 706 may receive processes 712, user inputs 714, parameters 716, and/or circuit component 720 and cause processes 712, user inputs 714, parameters 716, and/or circuit component 720 to be stored in memory 704.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A system, comprising:
   a nonvolatile memory storing a plurality of encrypted helper data sets, the plurality of encrypted helper data sets decryptable using respective ones of a plurality of keys that are different from each other of the plurality of keys; and,
   a physically unclonable function circuit to output a plurality of different fingerprint values based on the physically unclonable function circuit using respective decrypted helper data sets that are respective decrypted versions of the plurality of encrypted helper data sets.

2. The system of claim 1, wherein a first authentication of the system is based on a first one of the plurality of different fingerprint values.

3. The system of claim 2, wherein a second authentication of the system is based on a second one of the plurality of different fingerprint values.

4. The system of claim 1, further comprising:
   a processor to receive a first one of the plurality of keys and to, based on the first one of the plurality of keys, generate a first one of the decrypted versions of the plurality of encrypted helper data sets from a first one of the plurality of encrypted helper data sets, the first one of the plurality of encrypted helper data sets to be used by the physically unclonable function circuit to output a first one of the plurality of different fingerprint values.

5. The system of claim 4, wherein, after the first one of the plurality of encrypted helper data sets is used by the physically unclonable function circuit to output the first one of the plurality of different fingerprint values, the processor is to receive a second one of the plurality of keys and to, based on the second one of the plurality of keys, generate a second one of the decrypted versions of the plurality of encrypted helper data sets from a second one of the plurality of encrypted helper data sets, the second one of the plurality of encrypted helper data sets to be used by the physically unclonable function circuit to output a second one of the plurality of different fingerprint values.

6. The system of claim 5, wherein, after the second one of the decrypted versions of the plurality of encrypted helper data sets is generated, verifier software external to the system is to determine that, based on the physically unclonable function circuit outputting the second one of the plurality of different fingerprint values and not outputting the second one of the plurality of different fingerprint values, the system is authentic.

7. The system of claim 5, wherein, the first one of the plurality of different fingerprint values is used to decrypt a first block of encrypted data and the second one of the plurality of different fingerprint values is used to decrypt a second block of encrypted data.

8. The system of claim 7, wherein the first block of encrypted data includes first executable code to be executed by the system and the second block of encrypted data includes second executable code to be executed by the system.

9. A method of authentication, comprising:
   receiving a first decryption key from a verifier system;
   decrypting, using the first decryption key and from nonvolatile memory, a first block of physically unclonable function (PUF) circuit helper data;
   using, by the PUF circuit, the first block of PUF circuit helper data to generate a first PUF circuit output value;
   based on the first PUF circuit output value, providing a first authentication value to the verifier system;
   after receiving the first decryption key from the verifier system, receiving a second decryption key from the verifier system;
   decrypting, using the second decryption key and from nonvolatile memory, a second block of PUF circuit helper data;
   using, by the PUF circuit, the second block of PUF circuit helper data to generate a second PUF circuit output value; and,
   based on the second PUF circuit output value, providing a second authentication value to the verifier system.

10. The method of claim 9, wherein the first PUF output value contributes to a first keysplit used to produce the first authentication value and the second PUF output value contributes to a second keysplit used to produce the second authentication value.

11. The method of claim 9, wherein after providing the second decryption key, the verifier system does not accept authentication values based on the first PUF circuit output value as indicating a system including the PUF circuit is authentic.

12. The method of claim 9, further comprising:
   receiving a first indicator of a first challenge stimulus, wherein the first challenge stimulus is used by the PUF circuit to generate the first PUF circuit output value.

13. The method of claim 12, wherein the first challenge stimulus is used by the PUF circuit to generate the second PUF circuit output value.

14. The method of claim 12, further comprising:
   receiving a second indicator of a second challenge stimulus, wherein the second challenge stimulus is used by the PUF circuit to generate the second PUF circuit output value.

15. A system to be authenticated, comprising:
   an interface to a host system;
   a prover integrated circuit coupled to the interface, the prover integrated circuit comprising:
   a nonvolatile memory storing, in encrypted form, a first block of physically unclonable function (PUF) circuit helper data and a second block of PUF circuit helper data, the first block of PUF circuit helper data to be decrypted using a first decryption key, the second block of PUF circuit helper data to be decrypted using a second decryption key;
   processing circuitry to receive, from the interface, the first decryption key and to decrypt the first block of PUF circuit helper data using the first decryption key;
   a PUF circuit to generate, using the first block of PUF circuit helper data, a first PUF circuit output value,

15 the processing circuitry to, based on the first PUF circuit output value, generate a first authentication value to be provided to the interface;

the processing circuitry to, after receiving the first decryption key from the interface, receive a second decryption key and to decrypt the second block of PUF circuit helper data using the second decryption key;

the PUF circuit also to generate, using the second block of PUF circuit helper data, a second PUF circuit output value that is different from the first PUF circuit output value; and, after the first authentication value is provided to the interface, the processing circuitry to, based on the second PUF circuit output value, generate a second authentication value to be provided to the interface.

16. The system of claim 15, wherein the first PUF output value contributes to a first keysplit used to produce the first authentication value and the second PUF output value contributes to a second keysplit used to produce the second authentication value.

17. The system of claim 15, wherein after the second decryption key is received, authentication values based on the second PUF circuit output value indicate the system including the PUF circuit is authentic.

18. The system of claim 15, wherein the interface is to further receive a first indicator of a first challenge stimulus, wherein the first challenge stimulus is used by the PUF circuit to generate the first PUF circuit output value.

19. The system of claim 18, wherein the first challenge stimulus is used by the PUF circuit to generate the second PUF circuit output value.

20. The system of claim 18, wherein the interface is to further receive a second indicator of a second challenge stimulus, wherein the second challenge stimulus is used by the PUF circuit to generate the second PUF circuit output value.

* * * * *